United States Patent [19]

Honecker

[11] Patent Number: 4,854,278
[45] Date of Patent: Aug. 8, 1989

[54] VEHICLE WITH A NOISE-DAMPED DRIVE ASSEMBLY

[75] Inventor: Günter Honecker, Seligenstadt, Fed. Rep. of Germany

[73] Assignee: Linde Aktiengesellschaft, Wiesbaden, Fed. Rep. of Germany

[21] Appl. No.: 179,588

[22] Filed: Apr. 8, 1988

[30] Foreign Application Priority Data

Apr. 9, 1987 [DE] Fed. Rep. of Germany ....... 3711945

[51] Int. Cl.⁴ .................. F02B 77/11; F01N 7/00; B60K 11/08; B60R 13/08
[52] U.S. Cl. .................... 123/198 E; 123/41.49; 123/41.7; 180/68.4; 181/204
[58] Field of Search ............ 123/41.49, 41.7, 198 E; 180/68.4, 69.22, 69.23; 181/204

[56] References Cited

U.S. PATENT DOCUMENTS

| | | | |
|---|---|---|---|
| 3,540,540 | 11/1970 | Schwab | 180/68.4 |
| 4,304,314 | 12/1981 | Sakaguchi et al. | 180/68.4 X |
| 4,428,446 | 1/1984 | Kimura et al. | 181/204 X |
| 4,445,584 | 5/1984 | Kimura et al. | 181/204 X |
| 4,503,931 | 3/1985 | Sugimoto et al. | 181/204 |
| 4,562,895 | 1/1986 | Kirchweger | 181/204 X |
| 4,590,891 | 5/1986 | Fujikawa et al. | 123/41.49 X |
| 4,610,326 | 9/1986 | Kirchweger et al. | 181/204 X |
| 4,691,668 | 9/1987 | West | 123/41.49 X |

FOREIGN PATENT DOCUMENTS

| | | |
|---|---|---|
| 2913648 | 10/1960 | Fed. Rep. of Germany . |
| 1209450 | 1/1966 | Fed. Rep. of Germany . |
| 1804607 | 5/1970 | Fed. Rep. of Germany . |
| 2436953 | 8/1975 | Fed. Rep. of Germany . |
| 2437995 | 2/1976 | Fed. Rep. of Germany . |
| 2655441 | 6/1978 | Fed. Rep. of Germany . |
| 2819657 | 11/1979 | Fed. Rep. of Germany . |
| 2912386 | 10/1980 | Fed. Rep. of Germany . |
| 8312422 | 7/1983 | Fed. Rep. of Germany . |
| 3508790 | 9/1985 | Fed. Rep. of Germany . |
| 7638312 | 6/1986 | Fed. Rep. of Germany . |
| 2170753 | 9/1973 | France . |
| 58-101824 | 6/1983 | Japan ................. 180/68.4 |
| 2025520 | 1/1980 | United Kingdom . |

*Primary Examiner*—Tony M. Argenbright
*Assistant Examiner*—Eric R. Carlberg
*Attorney, Agent, or Firm*—Thomas R. Shaffer

[57] ABSTRACT

A vehicle with a noise-damped drive assembly is disclosed which includes a liquid-cooled internal combustion engine having a radiator with a cooling fluid running therethrough and located in a stream of air. An exhaust manifold having a drive assembly connected thereto is provided. The drive assembly is surrounded by a noise-damping case which has at least one air inlet opening located in a lower front portion of the case in a direction of travel of the vehicle. The case also has at least one air outlet opening located in an upper back portion of the case in the direction of travel. The radiator and exhaust manifold located outside of the case.

6 Claims, 3 Drawing Sheets

VEHICLE WITH A NOISE-DAMPED DRIVE ASSEMBLY

BACKGROUND OF THE INVENTION

1. Field of the Invention.

The invention relates to a vehicle with a noise-damped drive assembly, having a liquid-cooled internal combustion engine with a radiator traversed by cooling fluid and located in an air stream, and an exhaust manifold, as well as a drive group flanged onto it, in which case the drive assembly is surrounded by a noise-damping case or housing provided with at least one air inlet opening and at least one air outlet opening.

2. Description of the Art.

In a familiar arrangement of this type, the entire air stream flowing through the radiator is conveyed through the case (DE-GM No. 76 38 312). The flow of air in and out of the engine compartment inside of the case takes place through openings in the case that are sufficiently large to carry the entire amount of cooling air. The action of the case is impaired by these relatively large openings.

SUMMARY OF THE INVENTION

The invention proposes to achieve as effective a noise-damping encapsulation of the drive assembly as possible, simultaneously with a favorable supply of cooling air and low production costs and to provide the required openings in the housing wall in an optimal manner.

This problem is solved according to the invention in that the air inlet opening of the housing is located in the lower front in the direction of travel and the air outlet opening is located at the upper rear with respect to the direction of travel and the radiator and exhaust manifold are located inside of the case or housing.

A thermo-siphon stack effect results due to the position of the openings in the housing wall; consequently, uplift forces act on the air flow. The large heat-removing units, radiator and exhaust manifold are located outside of the housing and have their own air inlet and air outlet channels; therefore, the housing can be kept small. The connecting lines to the heat-removing units are advantageously arranged with the shortest possible connection to the housing wall. A minimal amount of heat is thus imparted to the air in the interior of the housing, essentially only the radiation heat of the engine itself, by which the air stream that flows through the interior of the housing can be kept small. As a result, it is sufficient to provide only smaller openings in the wall of the housing for the air stream to pass through. If the air outlet opening of the housing empties into the air channel through which the air stream passing through the radiator flows, in a zone in which this air stream has a low static pressure, the air stream can emerge free of disturbance due to the suction effect of the underpressure and mix with the air stream in the air channel of the radiator. If this air stream from the housing behind the radiator mixes with the air stream flowing through the radiator, the temperature of the air stream flowing through the radiator is correspondingly lower, such that a smaller radiator is required to achieve a maximal heat exchange. But even if this air stream is mixed in front of the radiator, the latter only needs to be slightly larger if only a little thermal energy is imparted to the air flowing through the engine compartment due to the arrangement of the heat-removing units in the engine compartment.

The radiator lying in the air stream can be a water radiator for a water-cooled engine or an oil cooler for the operating oil of a hydrostatic drive unit or the motor oil of the engine. Several radiators can also be provided in the air stream.

In a (personal) automobile, in which the engine and thus the engine compartment are located in the front in the usual manner and the radiator is located in front of the engine, in which case the engine is noise-damped, the arrangement of the air inlet into the engine compartment at the lower front in front of the radiator is already known (DE-OS No. 729 12 386). The natural air flow due to the pressure head in front of the vehicle is utilized here for supporting the flow through the radiator. A completely different problem is posed for the air inlet in a vehicle in which the engine compartment is located in the rear or at least in the middle, the radiator is located behind it and a utilization of a substantial pressure head effect is not involved due to the very slight travel speed as a result of the operating conditions.

It is also favorable if the air stream flows around the exhaust manifold after leaving the housing and the radiator.

It is advantageous to design the openings of the housing as noise-damping slit-like channels that extend over the entire width of the housing. The noise damping can be further improved if both the air inlet channel and the air outlet channel of the housing are curved, especially multiply curved, so that the air stream is turned back several times and thus the emergence of high-frequency sound waves, which are radiated in a straight line, is inhibited.

As is known, the ventilator fan can be operated with a hydraulic or electric motor with a variable speed or variable speed conversion between the engine speed and the blower speed, in which the conversion ratio can be continuously variable or variable by steps. Through this speed adaptation, the result is not only that the blower absorbs only the energy required for the current operating state, but also produces only as much noise as is necessary for the prevailing operating state. The blower drive can be adapted to the need temperature wise. Preferably, the adjustment is read off by means of a pick-up on the speed regulating device of the engine, e.g., on the speed regulating lever of the injector of a Diesel engine or on the adjusting lever of the throttle flap of a gasoline engine, such that, independently of the temperature-dependent or additionally to the temperature-dependent ventilator motor circuit, the lowest possible blower motor speed is always switched in for the prevailing operating state if the engine is operated in the lower speed range.

Additionally, the blower speed is preferably set in accordance with need and shutters are opened or partially closed at the fresh air inlet of the suction channel to the radiator or at the channel exit, either electrically or by a modified underpressure, so that the resistance of the suction air is defined and thus the air stream from the housing interior can flow out in a determined manner due to the underpressure beyond the air outlet opening.

According to the present invention an expedient implementation form results if the upper side of the housing is preferably designed as a hood that can be raised, at least on a portion of its extension, a hood that has a lip that forms a flow reversing wall in the channel when the hood is down.

It is preferred, especially in scoop loaders, if the encased drive assembly is located close to the counterweight and is suspended in a vibration-insulating manner so that the axis of the engine shaft is perpendicular to the longitudinal median plane of the vehicle. This facilitates not only a very short scoop loader, but also primarily makes it possible for the outer wall of the housing that directly delimits the driver's compartment, to be as small as possible, which essentially insulated the driver's compartment from vibrations and noise and heat generation. The installation of an engine crosswise in a forklift is also known (DE-PS No. 12 09 450).

In a favorable implementation form of the invention, the air inlet channel of the housing is located under the bedplate of the driver's compartment and the support for the pedals is found therein. The support of the pedals is thus in a space in which only a low noise level prevails, because this space is connected with the engine space by a multiply curved channel. Therefore, hardly any noise is conveyed through the openings of the pedal linkage into the driver's compartment.

It is also particularly advantageous if a tank for an operating medium, especially an oil tank, preferably an oil storage tank for a hydrostatic drive unit is located between the drive unit axis perpendicular to the longitudinal median plane of the vehicle and the housing surrounding the engine, in which case the air inlet for the air entering the housing runs through under the operating medium tank and/or is conveyed past along its side walls. A channel located under the tank can be positioned on only a portion of the width of the tank, in which case the tank surrounds the channel in a U-shaped manner and possibly has cooling fins in the region of the channel in order to cool the operating medium in the tank favorably. This arrangement facilitates a multiply curved layout of the channel.

The invention is elucidated in more detail in the following on the basis of the scoop loader presented in the drawing as an implementation example.

DETAILED DESCRIPTION OF THE PREFERRED EMBODIMENT

Figure 1:
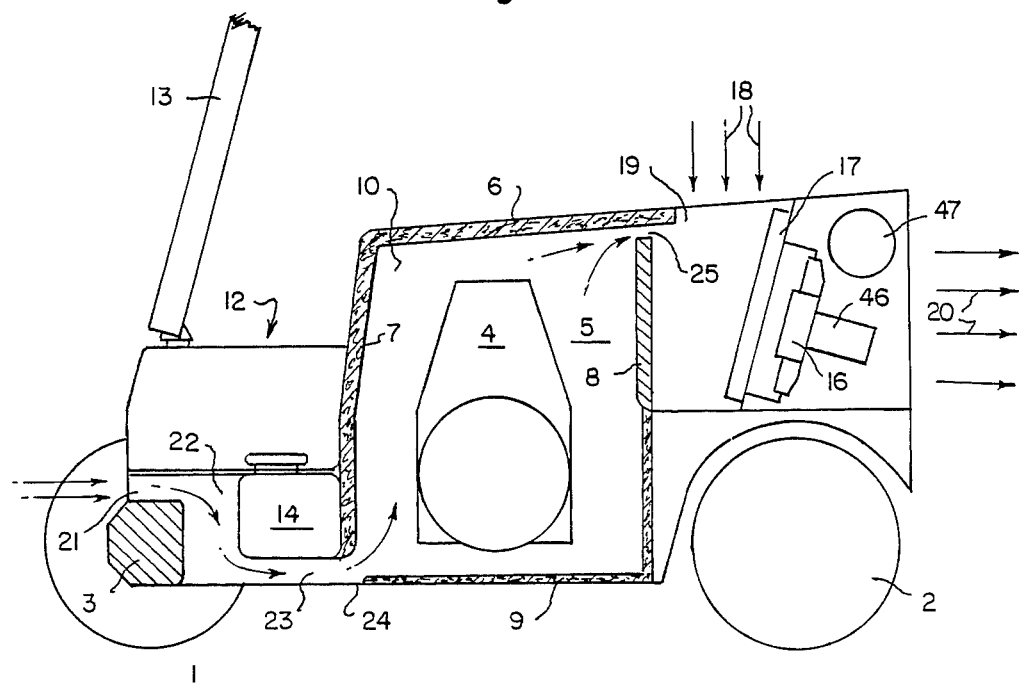
FIG. 1 schematically shows a section through a scoop loader, where the sectional plane lies in the longitudinal median plane of the vehicle.

The scope loader has two front wheels 1 and two rear wheels 2. The front wheels 1 are driven by the engine 4 by means of an axle drive unit 3. The engine 4 is in an engine compartment, the upper side 6, front wall 7, rear wall 8 and bottom wall 9 as well as the side walls 10 and 11 of which are lined with a noise damping material. A driver seat (not shown) is fastened on the upper wall 6 of the engine compartment 5. The space for the driver's legs is designated by 12 and one of the two front props of the driver's protective roof (not shown) is designated by 13. An operating medium tank 14 is located in front of the front wall 7 of the engine compartment 5. An air collecting space 15 is provided behind the upper part of the rear wall 8 of the engine compartment 5, from which the air is drawn through the radiator 17 by means of a blower 16. The arrows 18 show that air can enter the space 15 from above in this implementation example. In another implementation form it is also possible for air to enter the space 15 from the sides. The side walls 19 of this space are lined with noise damping material. The arrows 20 show that the air stream induced by the blower 16 emerges from the vehicle toward the rear.

The engine compartment 5 is traversed by an air stream that enters in the front above the axle drive unit 3 into an initial channel section 21 formed between it and the bedplate of the driver compartment. A second channel section 22 is connected to the first section 21 and it runs approximately vertically between the axle drive unit 3 and the tank 14. Another channel section 23 is connected to it and it is formed between the tank 14 and the lower wall 24 of the frame. The air flows from this channel section 23 into the engine compartment 5 and leaves it through the slot 25 between the upper edge of the rear wall 8 and the underside of the upper wall 6.

Figure 2:
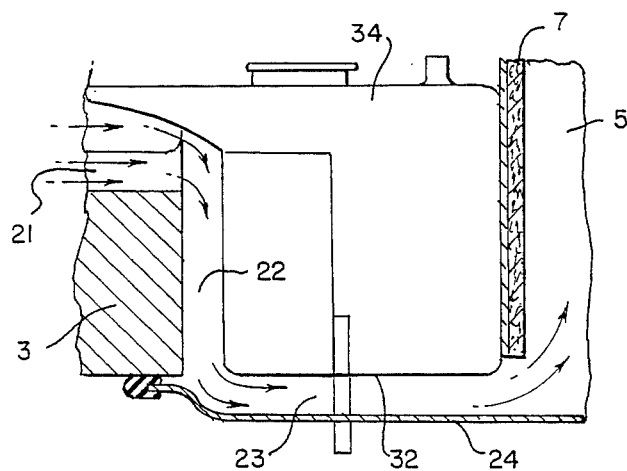
FIG. 2 shows a somewhat modified detail of FIG. 1 in a larger scale in the cross section in the same plane.
Figure 3:
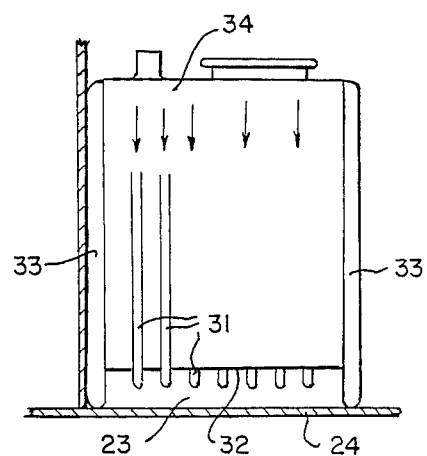
FIG. 3 shows a view of the tanks from FIG. 2 in the view of the left in FIG. 2.

The tank 34 shown in FIGS. 2 and 3 differs from tank 14 only in that it has components 33 that project downward on the sides so that the bottom wall 32 of the tank 34 and the side walls 33 surround the channel 23 in a U-shaped manner. Cooling fins 31 are also provided.

Figure 4:
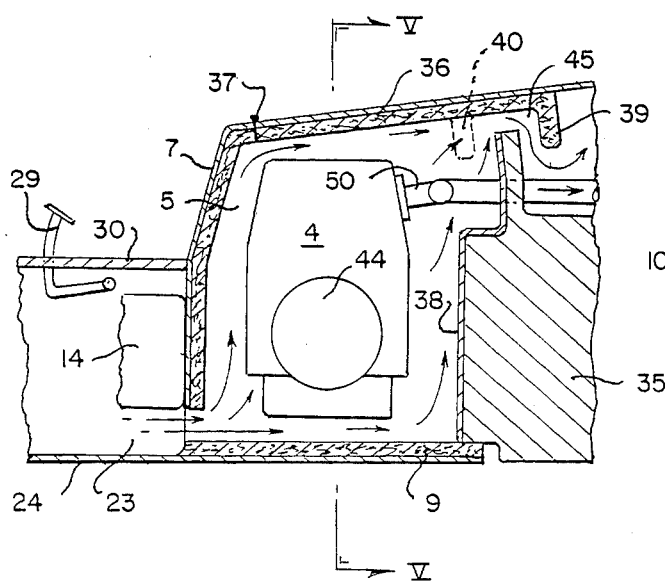
FIG. 4 shows another somewhat modified detail of FIG. 1 in the same sectional plane as in FIG. 1.
Figure 5:
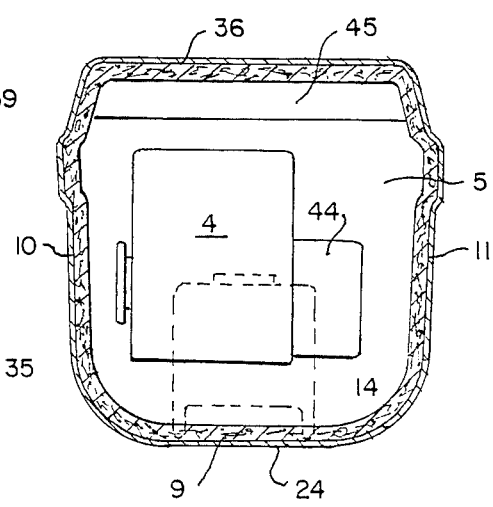
FIG. 5 shows a section through FIG. 4 in the sectional plane V–V of FIG. 4.
Figure 7:
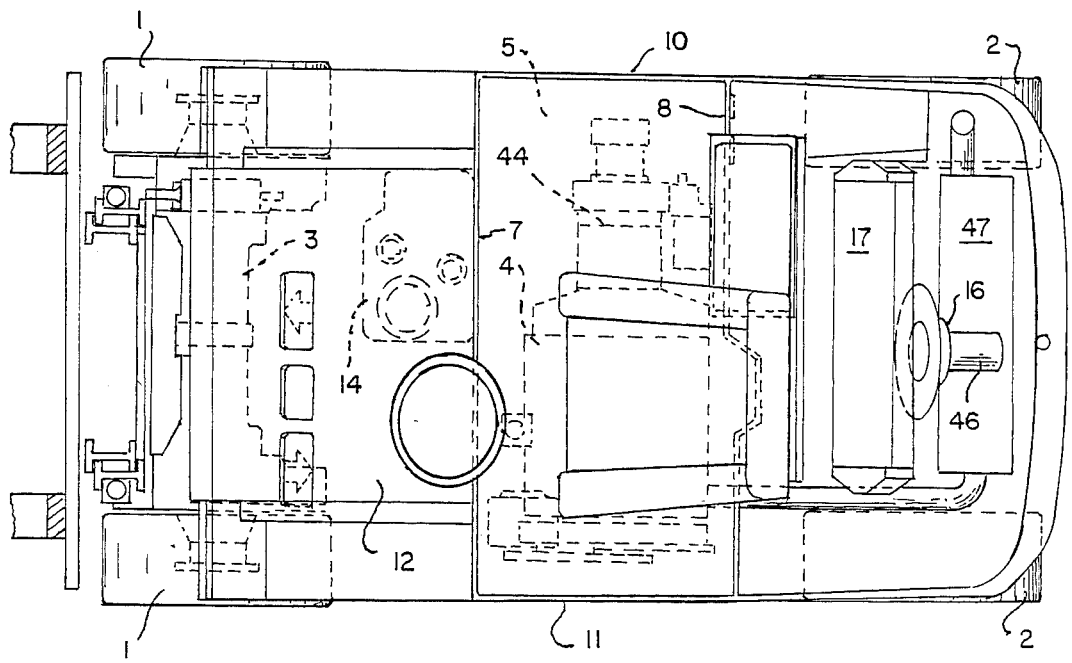
FIG. 7 shows a top view of a modified construction.

It can be seen in FIG. 4 that the support of the pedals 29 under the foot plate 30 of the driver compartment 12 is located in the channel 21, 22. It can also be seen that the rear wall 38 of the engine compartment 5 is formed directly on the counterweight 35. A portion of the upper wall of the engine compartment 5 is designed as a hood 36 that can be swung up on a hinge 37. On this hood 36 there is a lip-like projection 39 of the noise damping material that angles the channel 45 so that the sound waves propagating in a straight line cannot escape through this channel. The possibility that a second lip-like projection 40 that results in an even more intense reversal of the air stream in the channel 45 is provided on the upper wall 36 is indicated by dashed lines. The pump 44 of the hydrostatic drive unit is flanged directly onto the engine 4.

Figure 6:
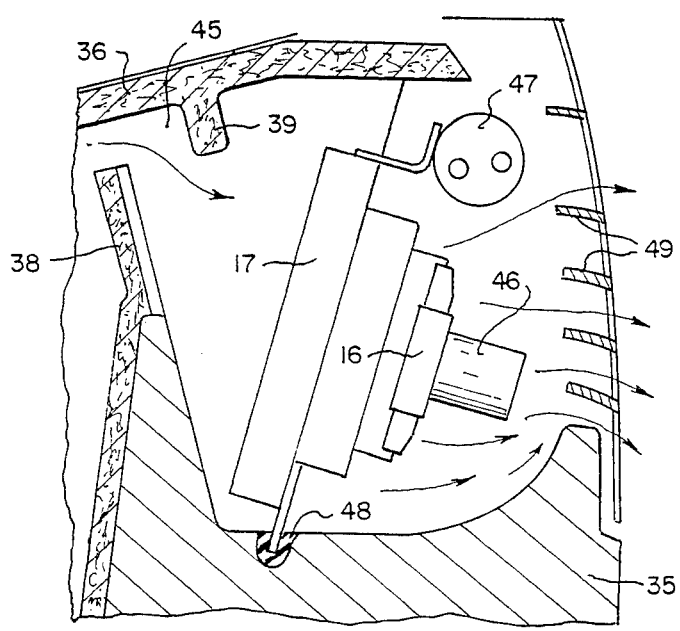
FIG. 6 shows another detail from FIG. 1 in larger scale in the same sectional plane as in FIG. 1.

It is evident from FIG. 6 that the radiator is supported in an elastic cushion 48 in the counterweight 35 and that the blower wheel 16 is driven by a ventilator motor 46 and that the exhaust manifold 47 is also fastened on the radiator 17 through a bracket.

The plates 49 guiding the emerging air stream are adjustable in a familiar manner. These plates 49 also form in the familiar manner an outward connection for the space in which the blower 16, 46 is located. The exhaust pipe 50 is arranged so that the part of it lying inside of the engine compartment 5 is as short as possible.

The arrangement of the housing walls 6, 7, 8, 38, 19, 11 is prescribed by the arrangement of the structural components such as the frame and the cross walls of the frame.

While certain preferably preferred embodiments of the present invention have been described it is to be distinctly understood that the invention is not limited thereto but may be otherwise variously provided within the scope of the following claims.

I claim:

1. A vehicle with a noise-damped drive assembly, comprising a liquid cooled internal combustion engine having a drive assembly connected thereto, said drive assembly surrounded by a noise-damping case having at least one air inlet opening located in a lower front portion of said case in a direction of travel of the vehicle and at least one air outlet opening located in an upper back portion of the case in said direction of travel, said engine having a radiator connected thereto with a cooling fluid running therethrough and located in a stream of air, said engine further having an exhaust manifold connected thereto, said radiator and exhaust manifold located outside of the case, said radiator being located in an air channel that has at least one air inlet opening and at least one air outlet opening, and the air outlet opening of the case empties into the air channel in a zone in which an air stream flowing through the air channel has a low pressure.

2. A vehicle according to claim 1 wherein said vehicle has a counterweight and the encased drive assembly is close to the counterweight and is suspended by vibration-insulating means so that an axis of a shaft of the internal combustion engine is perpendicular to a longitudinal median plane of the vehicle.

3. A vehicle according to claim 2, wherein air inlet channel of the case is located under a bedplate provided in a driver's compartment of the vehicle and a support for pedals of the vehicle are provided and located in the air inlet channel.

4. A vehicle according to claim 3, further comprising a working materials container, wherein the work materials container is provided in front of the case in the direction of travel and the air inlet channel conveying the air into the inside of the case is located under at least one of a portion of a width of the container and alongside it.

5. Vehicle according to claim 4, wherein the container is provided with cooling fins in the region of the air inlet channel.

6. Vehicle according to claim 4, further comprising front wheel drive means in the form of an axle drive unit, wherein the container is located between the axle drive unit and a housing of the engine.

* * * * *

UNITED STATES PATENT AND TRADEMARK OFFICE
CERTIFICATE OF CORRECTION

PATENT NO. : 4,854,278

DATED : August 8, 1989

INVENTOR(S) : Gunter Honecker

It is certified that error appears in the above-identified patent and that said Letters Patent is hereby corrected as shown below:

Column 2, line 14, change "729" to --29--.

Signed and Sealed this

Twelfth Day of June, 1990

Attest:

HARRY F. MANBECK, JR.

*Attesting Officer*     *Commissioner of Patents and Trademarks*